(12) United States Patent  
Graf et al.

(10) Patent No.: US 8,550,056 B2
(45) Date of Patent: Oct. 8, 2013

(54) ELECTRIC CIRCUIT FOR TRIGGERING A PIEZOELECTRIC ELEMENT, IN PARTICULAR A FUEL INJECTION SYSTEM OF A MOTOR VEHICLE

(75) Inventors: Marco Graf, Ditzingen (DE); Joerg Reineke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 914 days.

(21) Appl. No.: 11/792,428

(22) PCT Filed: Oct. 20, 2005

(86) PCT No.: PCT/EP2005/055424
§ 371 (c)(1),
(2), (4) Date: Feb. 25, 2009

(87) PCT Pub. No.: WO2006/061290
PCT Pub. Date: Jun. 15, 2006

(65) Prior Publication Data
US 2009/0211557 A1    Aug. 27, 2009

(30) Foreign Application Priority Data
Dec. 6, 2004 (DE) .................. 10 2004 058 671

(51) Int. Cl.
*F02M 51/00* (2006.01)
*H01L 41/00* (2013.01)
*H02N 2/00* (2006.01)
(52) U.S. Cl.
USPC .................. 123/494; 310/316.03; 310/317

(58) Field of Classification Search
USPC .............. 123/490, 498, 499; 310/316.03, 310/317, 318, 319; 239/102.2
See application file for complete search history.

(56) References Cited

U.S. PATENT DOCUMENTS

| 6,081,061 | A  | * | 6/2000  | Reineke et al. | 310/316.03 |
| 6,109,245 | A  | * | 8/2000  | Egger et al.   | 123/490    |
| 6,333,585 | B1 | * | 12/2001 | Hoffmann et al.| 310/316.03 |
| 6,384,512 | B1 | * | 5/2002  | Maeda          | 310/316.03 |
| 6,522,049 | B2 | * | 2/2003  | Rueger         | 310/319    |
| 6,617,755 | B2 | * | 9/2003  | Kawamoto       | 310/316.03 |
| 6,700,301 | B2 | * | 3/2004  | Rueger et al.  | 310/316.03 |
| 7,705,604 | B2 | * | 4/2010  | Graf et al.    | 324/522    |
| 7,729,848 | B2 | * | 6/2010  | Gotzenberger   | 701/114    |

FOREIGN PATENT DOCUMENTS

| DE | 197 33 560 | 2/1999  |
| DE | 100 33 196 | 1/2002  |
| EP | 1 139 442  | 10/2001 |
| JP | 2001-502120| 2/2001  |
| JP | 2002-81341 | 3/2002  |
| JP | 2003-319667| 11/2003 |

* cited by examiner

*Primary Examiner* — Mahmoud Gimie
*Assistant Examiner* — David Hamaqui
(74) *Attorney, Agent, or Firm* — Kenyon & Kenyon LLP

(57) ABSTRACT

An electric circuit for triggering a piezoelectric element, in particular of a fuel injection system of a motor vehicle. Two transistors connected in series and triggerable using a clock pulse are provided, whose shared connecting point is coupled to the piezoelectric element and one of which is provided for discharging the piezoelectric element. In the event of an error, the transistor provided for discharging can be triggered using the clock pulse.

12 Claims, 5 Drawing Sheets

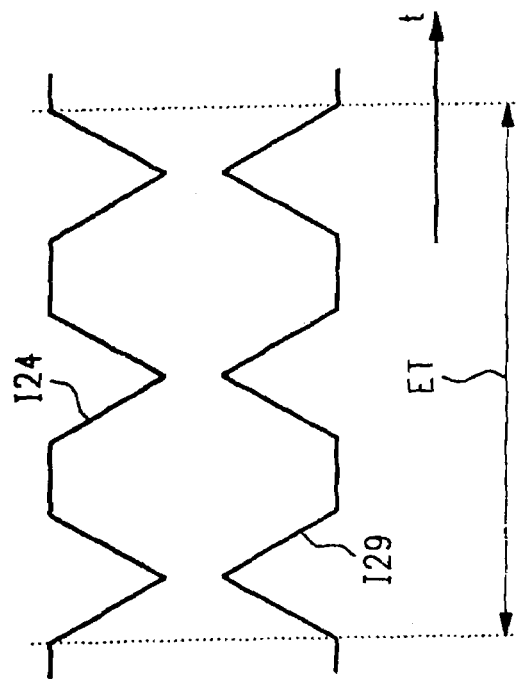
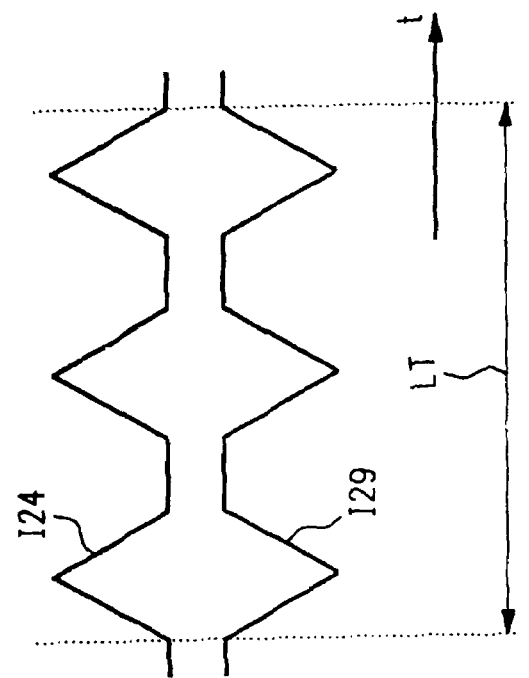
Fig. 3a
Fig. 3b

ELECTRIC CIRCUIT FOR TRIGGERING A PIEZOELECTRIC ELEMENT, IN PARTICULAR A FUEL INJECTION SYSTEM OF A MOTOR VEHICLE

FIELD OF THE INVENTION

The present invention is directed to an electric circuit for triggering a piezoelectric element, in particular of a fuel injection system of a motor vehicle. The present invention also relates to a corresponding method for triggering a piezoelectric element, as well as a corresponding computer program, a corresponding electric memory medium, and a corresponding control unit, in particular for a fuel injection system of a motor vehicle.

BACKGROUND INFORMATION

An electric circuit is described in European Patent Application No. EP 1 139 442, where a plurality of series circuits having a piezoelectric element and a transistor are connected in parallel. A first measuring shunt is grounded in series with the parallel circuit. The parallel circuit is also connected, via an inductance coil, to the shared connecting point of two transistors connected to ground in series. A series circuit of a capacitor and a second measuring shunt is grounded in parallel to the two transistors.

One of the two above-mentioned transistors is provided for discharging the piezoelectric elements. For this purpose, this transistor is triggered using a clock pulse.

In the event of an error, a possibly charged piezoelectric element must be able to be rapidly discharged. An additional stop switch is provided for this case in European Patent Application No. EP 1 139 442. This is an additional transistor and an associated resistor, via which the piezoelectric elements may be discharged without clock pulse control in the event of an error. Due to the currents that may be flowing, the implementation of this stop switch requires increased complexity.

SUMMARY OF THE INVENTION

An object of the present invention is to provide an electric circuit for triggering a piezoelectric element, using which quick discharge of the piezoelectric element is ensured in the event of an error Without special complexity being needed therefor.

This object is achieved according to the present invention.

According to the present invention, in the event of an error, the transistor provided for discharging is triggered using the available clock pulse. This makes it possible to control and thus influence, without major complexity, the discharge current flowing during the discharge of the piezoelectric elements. The piezoelectric elements may be discharged via the existing transistor provided for discharging. No special complexity is thus needed, in particular no additional transistor for discharging the piezoelectric elements in the event of an error.

The present invention thus makes it possible to discharge the piezoelectric elements rapidly and reliably in the event of an error without any special complexity being needed.

It is particularly advantageous if the discharge current flowing during the discharge is controlled and/or regulated. It is advantageous that the discharge current flowing during the discharge is ascertained, in particular using a measuring shunt connected in series with the two transistors. Instead of the measuring shunt, other means for measuring current may also be provided, for example, an inductive current measurement.

BRIEF DESCRIPTION OF THE DRAWINGS

FIGS. 2a and 2b show the circuit of FIG. 1 with current paths drawn in.

FIGS. 3a and 3b show schematic time diagrams of electric currents in the circuits of FIGS. 2a and 2b.

DETAILED DESCRIPTION

Figure 1:
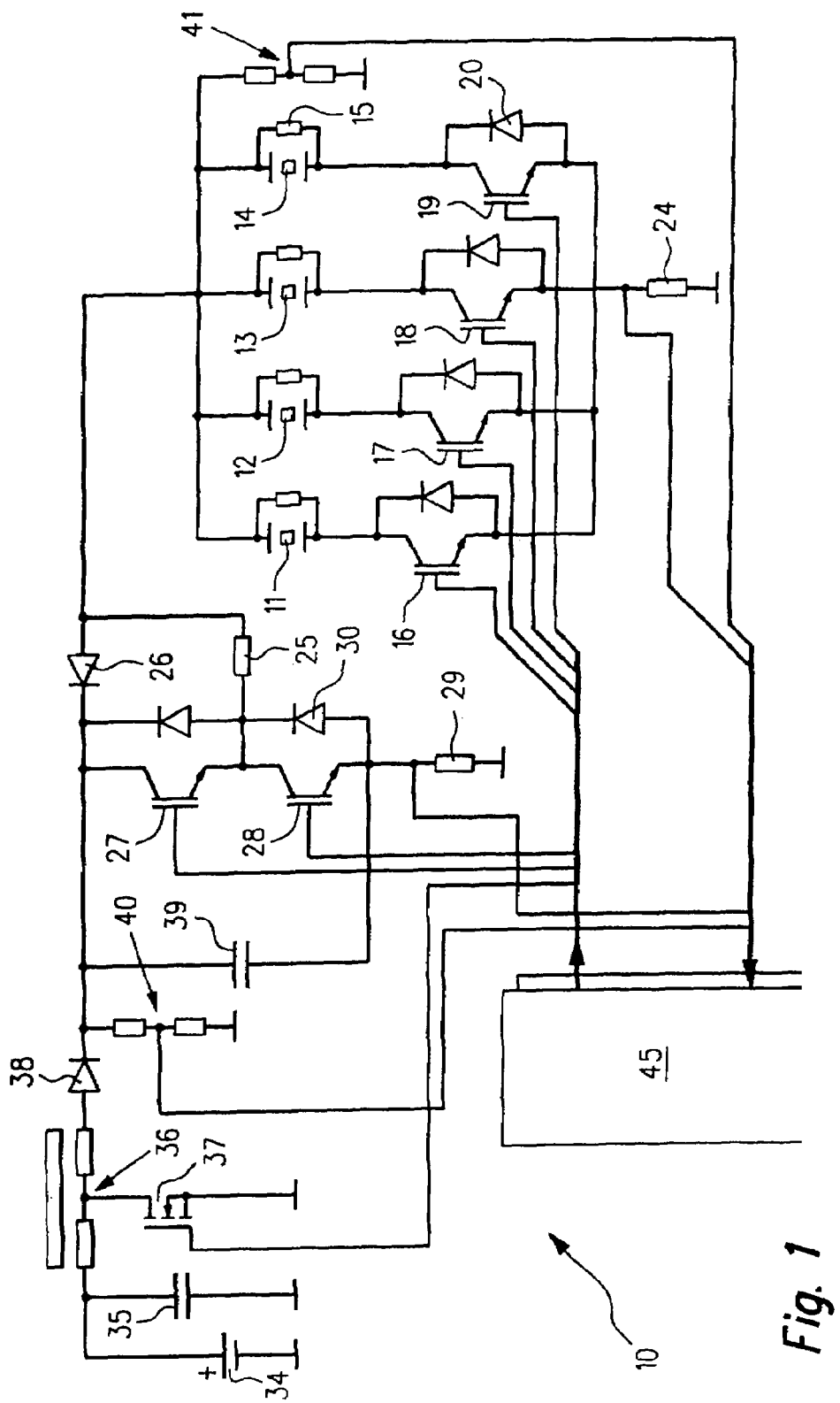
FIG. 1 shows a schematic block diagram of an electric circuit for triggering piezoelectric elements, in particular a fuel injection system of a motor vehicle.

FIG. 1 shows an electric circuit 10, which has four piezoelectric elements 11, 12, 13, 14. Of course, a different number of piezoelectric elements may also be provided. Piezoelectric elements 11, 12, 13, 14 may be used, in particular in a fuel injection system of a motor vehicle, for injecting fuel.

A resistor 15 is connected in parallel to each of piezoelectric elements 11, 12, 13, 14. Furthermore, a transistor 16, 17, 18, 19 is connected in series with each of piezoelectric elements 11, 12, 13, 14. A freewheeling diode 20 is connected in parallel to each of transistors 16, 17, 18, 19.

The four piezoelectric elements 11, 12, 13, 14 are connected in parallel to one another. The four transistors 16, 17, 18, 19, connected in series with piezoelectric elements 11, 12, 13, 14, are thus also connected in parallel to one another. On the side of these transistors 16, 17, 18, 19, the parallel circuit is grounded using a first measuring shunt 24.

First measuring shunt 24 measures the current. Of course, instead of first measuring shunt 24, other means for measuring current, such as an inductive current measurement, may also be used.

On the other side, i.e., on the side of piezoelectric elements 11, 12, 13, 14, the parallel circuit is connected to a coil 25 and to the anode of a freewheeling safety diode 26. The cathode of freewheeling safety diode 26 is grounded via the series circuit of two transistors 27, 28 and a second measuring shunt 29.

Second measuring shunt 29 measures the current. Of course, instead of measuring shunt 29, other means for measuring current, such as an inductive current measurement, may also be used.

A freewheeling diode 30 is connected in parallel to each of the two transistors 27, 28. The shared connecting point of the two transistors 27, 28 is connected to coil 25.

The previously explained circuit 10 is supplied with power from a grounded battery 34. A smoothing capacitor 35 is grounded in parallel to battery 34. The positive terminal of battery 34 is connected to a DC-DC converter 36, which is controlled by a grounded transistor 37. The side of DC-DC converter 36 facing away from battery 34 is connected to the anode of a diode 38, whose cathode is connected to the cathode of freewheeling safety diode 26.

A capacitor 39, which is also connected to second measuring shunt 29, is connected to this shared connecting point of the two diodes 26, 38. Furthermore, a grounded voltage divider 40 is connected to this shared connecting point. Another voltage divider 41 is grounded from the anode of freewheeling safety diode 26.

Transistors 16, 17, 18, 19, assigned to piezoelectric elements 11, 12, 13, 14, the two transistors 27, 28, and transistor 37 assigned to DC-DC converter 36 are connected to and controlled by an ASIC 45 (ASIC—Application-Specific Integrated Circuit). The two measuring shunts 24, 29 and the two voltage dividers 40, 41 are also connected and deliver their currents or voltages to this ASIC 45.

Electric circuit 10 is thus triggered by ASIC 45. ASIC 45, in turn, is triggered by a microprocessor (not shown). ASIC 45 thus represents the interface between circuit 10 forming an output stage and the microprocessor.

Electric circuit 10, ASIC 45, and the microprocessor together form a control unit. Piezoelectric elements 11, 12, 13, 14 are, however, outside the control unit and also outside electric circuit 10, i.e., the above-mentioned ASIC 45 and connected to electric circuit 10 via connecting lines, for example, a cable harness.

The control unit is used for controlling and/or regulating the currents supplied to piezoelectric elements 11, 12, 13, 14. For this purpose, the control unit has a computer in the form of the above-mentioned microprocessor having an electric memory medium, a flash memory in particular. A computer program capable of running on the computer is stored on the memory medium. This computer program is suitable for influencing the currents through piezoelectric elements 11, 12, 13, 14 and thus to perform the desired control and/or regulation.

Battery 34 has a DC voltage of 12 V or 24 V, for example. This DC voltage is transformed to 240 V, for example, by DC-DC converter 36. This stepped-up DC voltage is applied to voltage divider 40, so that this voltage may be ascertained by ASIC 45 via voltage divider 40. The stepped-up DC voltage also charges capacitor 39. The voltage applied to capacitor 39 is also applied to the series circuit of the two transistors 27, 28.

Only one of the two transistors 27, 28 is triggered each time by ASIC 45. Furthermore, when triggered, the two transistors 27, 28 are switched, under clock pulse control, to the conductive state. The necessary clock pulse is usually provided to electric circuit 10 from the outside. The clock pulse may, however, also be generated by electric circuit 10 itself. The clock pulse is preferably a square-wave signal having consecutive ON and OFF time periods. The ON and OFF time periods may differ from one another. The ON and OFF time periods may also be variable.

When transistor 27 is switched to the conducting state, one of the piezoelectric elements 11, 12, 13, 14 may be charged. However, when transistor 28 is switched to the conducting state, one charged piezoelectric element 11, 12, 13, 14 may be discharged. The voltage applied to the particular piezoelectric element 11, 12, 13, 14 may be ascertained by ASIC 45 with the aid of voltage divider 41. The rise of the current flowing during charging or discharging is limited with the help of coil 25. With the help of transistors 16, 17, 18, 19, ASIC 45 may select the piezoelectric element 11, 12, 13, 14 which is to be charged.

Figure 2A:
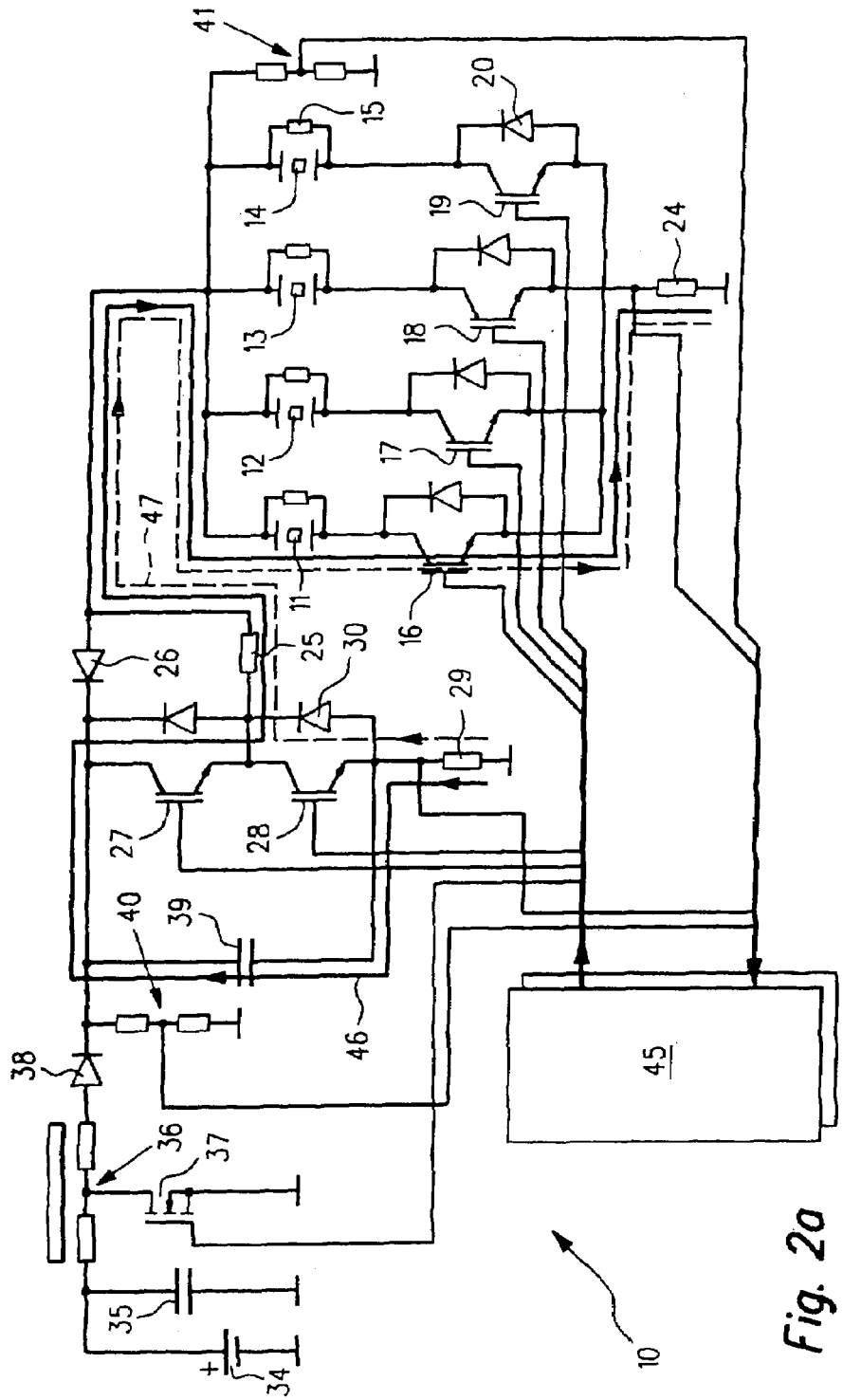

Charging one of piezoelectric elements 11, 12, 13, 14 is elucidated below with reference to FIGS. 2a, 3a.

For example, if piezoelectric element 11 is to be charged, transistors 16, 27 are first switched to conducting by ASIC 45. A current flows from capacitor 39 via conducting transistor 27, coil 25, piezoelectric element 11, conducting transistor 16, first measuring shunt 24, and ground, and back to capacitor 39 via second measuring shunt 29. This current path is indicated in FIG. 2a by solid line 46.

Transistor 27 is subsequently blocked. A current flows from coil 25 via piezoelectric element 11, conducting transistor 16, first measuring shunt 24, ground, through second measuring shunt 29, and through the lower of the two freewheeling diodes 30 back to coil 25. This current path is indicated in FIG. 2a by dashed line 47.

Transistor 27 is then switched to conducting again, so that a current flows again according to current path 46. Transistor 27 continues to be cycled until piezoelectric element 11 is charged to a desired voltage.

In FIG. 3a, the currents flowing through the two measuring shunts 24, 29 are plotted against time t. Current 124 shown in the upper diagram is the current through measuring shunt 24, and current 129 shown in the lower diagram is the current through measuring shunt 29. Furthermore, charging time LT during which transistor 27 is cycled to charge piezoelectric element 11 as desired is shown in FIG. 3a.

The discharging of one of piezoelectric elements 11, 12, 13, 14 is basically identical to the charging of one of piezoelectric elements 11, 12, 13, 14 as explained above, with the direction of current in particular changing. This discharge is elucidated below with reference to FIGS. 2b, 3b.

Figure 2B:
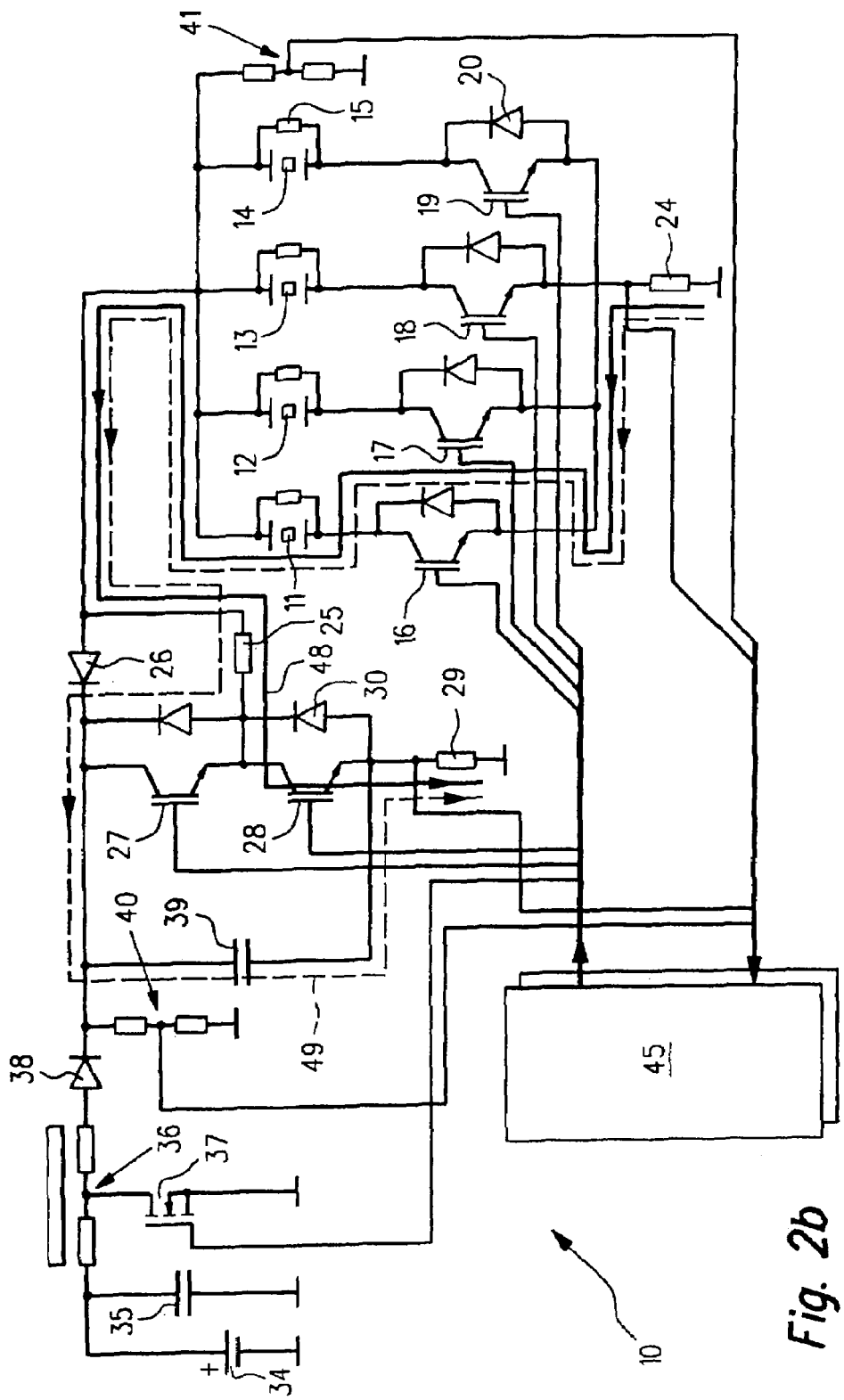

For example, if piezoelectric element 11 is to be discharged, transistor 28 and transistor 16 are first switched to conducting by ASIC 45. A current flows on a current path as shown in FIG. 2b by solid line 48. Transistor 28 is subsequently blocked. A current flows on a current path as shown in FIG. 2b by dashed line 49. Transistor 28 is then switched to conducting again, so that a current according to current path 48 flows again. Transistor 28 continues to be cycled until piezoelectric element 11 is discharged as desired.

In FIG. 3b, the currents flowing through the two measuring shunts 24, 29 are plotted against time t. Current 124 shown in the upper diagram is the current through measuring shunt 24, and current 129 shown in the lower diagram is the current through measuring shunt 29. Furthermore, discharging time ET during which transistor 28 is cycled to discharge piezoelectric element 11 as desired is shown in FIG. 3b.

Errors of electric circuit 10 or piezoelectric elements 11, 12, 13, 14 may be detected, for example, with the aid of the two measuring shunts 24, 29 and currents 124, 129 flowing through these measuring shunts 24, 29. In particular, the control unit may detect whether or that a terminal of one of piezoelectric elements 11, 12, 13, 14 is shorted to ground or to the DC voltage delivered by battery 34.

In the event of an error, for example, in the case of a short-circuit of a piezoelectric element 11, 12, 13, 14 to ground or to the DC voltage delivered by battery 34, one of piezoelectric elements 11, 12, 13, 14 may be charged or at least partially charged at the point in time of the error detection. To protect the particular piezoelectric element 11, 12, 13, 14, it is then necessary to discharge this piezoelectric element 11, 12, 13, 14 again and to set electric circuit 10 to a safe operating state.

If an error of this type is detected by the control unit, a controlled and/or regulated discharge of piezoelectric elements 11, 12, 13, 14 is performed by the control unit.

During this discharge process, current 129 is ascertained via measuring shunt 29. This current 129 is available even if there is a short-circuit of a terminal of one of piezoelectric elements 11, 12, 13, 14 to ground or to the DC voltage delivered by battery 34. Current 124 via measuring shunt 24 is, however, at least not reliably available in the above-mentioned cases of error.

Depending on current 129 via measuring shunt 29, the discharge of piezoelectric elements 11, 12, 13, 14, in particular the discharge current flowing during discharge, is controlled and/or regulated by ASIC 45. This is elucidated below with reference to FIGS. 4 and 5.

Figure 4:
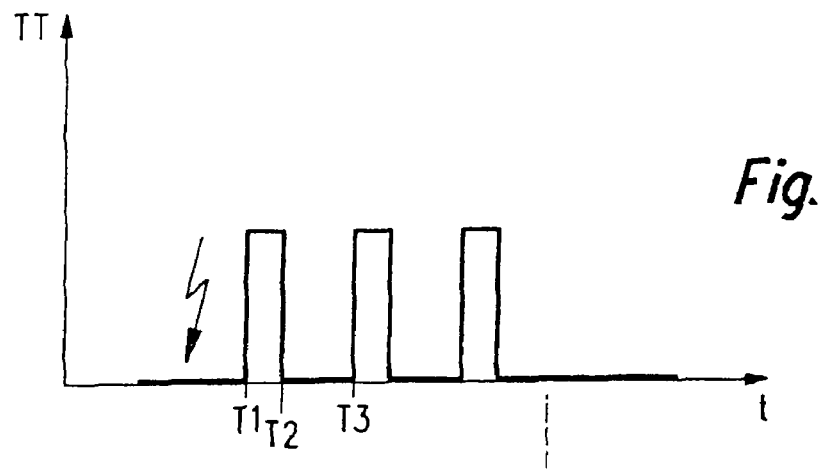
FIGS. 4 and 5 show schematic time diagrams of a trigger signal and a voltage of the circuit of FIG. 1.
Figure 5:
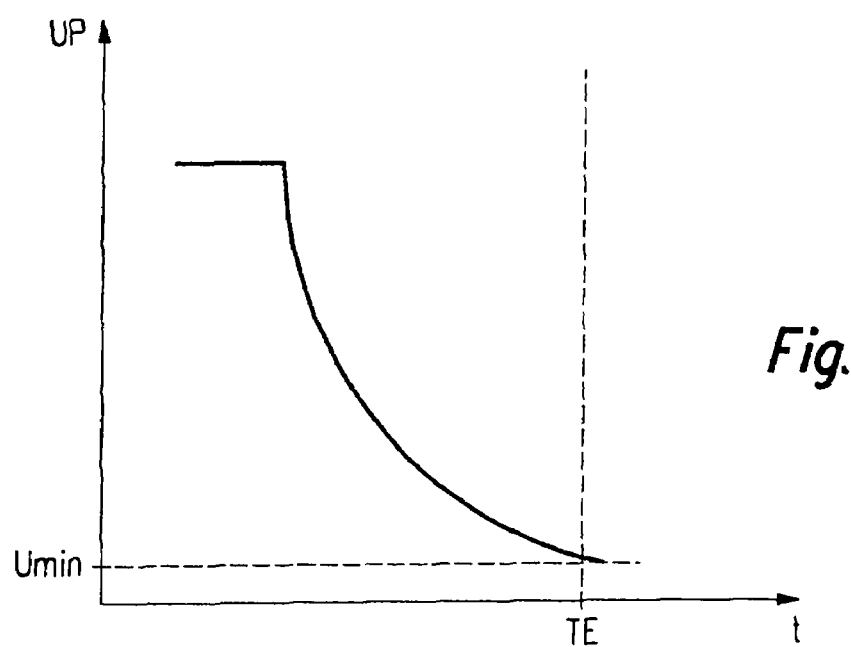

In FIG. 4, clock pulse TT used to trigger transistor 28 is plotted against time t. In FIG. 5, voltage UP applied to at least one of piezoelectric elements 11, 12, 13, 14 is plotted against time t. This is equivalent to one of piezoelectric elements 11, 12, 13, 14 being charged or at least partially charged at this point in time.

To discharge, transistor 28 is initially closed at a point in time T1. A discharge current then flows from piezoelectric elements 11, 12, 13, 14 via coil 25, transistor 28, and measuring shunt 29 to ground. Voltage UP applied to piezoelectric elements 11, 12, 13, 14 decreases over time. This is apparent from FIG. 5. The discharge current is measured with the aid of measuring shunt 29. When the discharge current reaches a predefined upper limiting value, transistor 28 is opened. This is shown in FIG. 4 as point in time T2.

A discharge current then flows from piezoelectric elements 11, 12, 13, 14 via coil 25, capacitor 39, and measuring shunt 29 to ground. Voltage UP applied to piezoelectric elements 11, 12, 13, 14 drops further. After a predefined time period or after the above-mentioned current has attained a lower limiting value, transistor 28 is closed again at a point in time T3. The discharge current flows again via transistor 28 and increases over time.

Due to the above-described switching of transistor 28 on and off, the corresponding piezoelectric elements 11, 12, 13, 14 are discharged. As explained above, transistor 28 is switched on and off as a function of the discharge current flowing through measuring shunt 29. Switching of transistor 28 on and off is terminated as soon as voltage UP applied to piezoelectric elements 11, 12, 13, 14 drops below a predefined value $U_{min}$. This is the case at a point in time TE in FIG. 5. Voltage UP may then be ascertained with the aid of voltage divider 41. It is then assumed that the corresponding piezoelectric element 11, 12, 13, 14 has been discharged or at least its voltage does not exceed the DC voltage delivered by battery 34.

If threshold $U_{min}$ cannot be attained due to a short circuit to the DC voltage delivered by battery 34, the discharge is terminated after a fixedly predefined time period.

Electric circuit 10 and piezoelectric elements 11, 12, 13, 14 thus exhibit a safe, in particular discharged, operating state. The discharge current flowing during the discharge essentially corresponds to the current also flowing during normal operation of electric circuit 10. The limiting values and time periods explained in connection with FIGS. 4 and 5 may possibly be predefined independently of the normal operation and thus adapted to the special case of a discharge in the event of an error.

What is claimed is:

1. An electric circuit for triggering a piezoelectric element comprising:
    first and second transistors connected in series, each of which can be triggered using a separate clock pulse and whose shared connecting point is coupled to the piezoelectric element; and
    a control unit configured to:
        during normal circuit operation in which no short at a terminal of the piezoelectric element is detected, trigger the first transistor using a first set of clock pulses to discharge the piezoelectric element so that a voltage level of the piezoelectric element decreases over time towards a predefined target voltage; and
        in response to detecting a presence of a short at the terminal of the piezoelectric element:
        monitor a discharge current flowing through the first transistor;
        generate, based on the monitoring, an additional set of clock pulses that, when used to trigger the first transistor, prevent the discharge current from exceeding a predefined limit value; and
        trigger the first transistor using the additional set of clock pulses instead of the first set of clock pulses, to discharge the piezoelectric element towards the target voltage.

2. The electric circuit according to claim 1, wherein the piezoelectric element is of a fuel injection system of a motor vehicle.

3. The electric circuit according to claim 1, wherein, during the discharge of the piezoelectric element in response to detecting the presence of the short, the control unit ascertains and, as a function thereof, regulates the discharge current by controlling a timing of the additional set of clock pulses.

4. The electric circuit according to claim 3, wherein the predefined limit value is an upper limiting value.

5. The electric circuit according to claim 3, further comprising a measuring shunt that ascertains the discharge current.

6. The electric circuit according to claim 5, wherein the measuring shunt is connected in series with the transistors.

7. A method for triggering a piezoelectric element comprising:
    during normal circuit operation in which no short at a terminal of the piezoelectric element is detected, triggering, using separate sets of clock pulses, first and second transistors connected in series, whose shared connecting point is coupled to the piezoelectric element, wherein the triggering of the first transistor using a first set of the clock pulses discharges the piezoelectric element so that a voltage level of the piezoelectric element decreases over time towards a predefined target voltage;
    detecting a presence of a short at the terminal of the piezoelectric element; and
    in response to detecting the presence of the short:
        monitoring a discharge current flowing through the first transistor;
        generating, based on the monitoring, an additional set of clock pulses that, when used to trigger the first transistor, prevent the discharge current from exceeding a predefined limit value; and
        triggering the first transistor using the additional set of clock pulses instead of the first set of clock pulses, to discharge the piezoelectric element towards the target voltage.

8. The method according to claim 7, wherein the piezoelectric element is of a fuel injection system of a motor vehicle.

9. The method according to claim 7, further comprising:
    during the discharge of the piezoelectric element in response to detecting the presence of the short, ascertaining and, as a function thereof, regulating the discharge current by controlling a timing of the additional set of clock pulses, wherein the discharge current is ascertained using a measuring shunt connected in series with the transistors.

10. A computer-readable medium containing a computer program which when executed by a processor performs the following method for triggering a piezoelectric element:
    during normal circuit operation in which no short at a terminal of the piezoelectric element is detected, triggering, using separate sets of clock pulses, first and second transistors connected in series, whose shared connecting point is coupled to the piezoelectric element, wherein the triggering of the first transistor using a first set of the clock pulses discharges the piezoelectric element so that a voltage level of the piezoelectric element decreases over time towards a predefined target voltage;
    detecting a presence of a short at the terminal of the piezoelectric element; and in response to detecting the presence of the short:
- monitoring a discharge current flowing through the first transistor;
- generating, based on the monitoring, an additional set of clock pulses that, when used to trigger the first transistor, prevent the discharge current from exceeding a predefined limit value; and
- triggering the first transistor using the additional set of clock pulses instead of the first set of clock pulses, to discharge the piezoelectric element towards the target voltage.

11. A control unit for operating a fuel injection system of a motor vehicle by triggering a piezoelectric element, comprising:

an arrangement configured to:
- during normal circuit operation in which no short at a terminal of the piezoelectric element is detected, trigger, using separate sets of clock pulses, first and second transistors connected in series, whose shared connecting point is coupled to the piezoelectric element, wherein the triggering of the first transistor using a first set of the clock pulses discharges the piezoelectric element so that a voltage level of the piezoelectric element decreases over time towards a predefined target voltage;
- detect a presence of a short at the terminal of the piezoelectric element; and
- in response to detecting the presence of the short:
  - monitor a discharge current flowing through the first transistor;
  - generate, based on the monitoring, an additional set of clock pulses that, when used to trigger the first transistor, prevent the discharge current from exceeding a predefined limit value; and
  - trigger the first transistor using the additional set of clock pulses instead of the first set of clock pulses, to discharge the piezoelectric element towards the target voltage.

12. The electric circuit according to claim 1, wherein during the discharging in response to detecting the presence of the short, the control unit alternately opens and closes first transistor by applying the additional set of clock pulses until one of the following occurs:
- a measured voltage at the piezoelectric element falls below the target voltage; and
- a predefined time period has passed since the discharge using the additional set of clock pulses was initiated.

* * * * *

UNITED STATES PATENT AND TRADEMARK OFFICE
CERTIFICATE OF CORRECTION

PATENT NO. : 8,550,056 B2  Page 1 of 1
APPLICATION NO. : 11/792428
DATED : October 8, 2013
INVENTOR(S) : Graf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1661 days.

Signed and Sealed this

Fifteenth Day of September, 2015

Michelle K. Lee
*Director of the United States Patent and Trademark Office*